United States Patent Office

3,769,208
Patented Oct. 30, 1973

3,769,208
TREATMENT OF WASTE BRINES
Shirl E. Cook and Samuel R. Henderson, Baton Rouge, La., assignors to Ethyl Corporation
No Drawing. Filed July 22, 1971, Ser. No. 165,324
Int. Cl. C02b 5/02
U.S. Cl. 210—57      7 Claims

ABSTRACT OF THE DISCLOSURE

Waste brines from bromine or iodine extraction processes are treated with ammonia prior to disposal.

BACKGROUND OF THE INVENTION

In various commercial processes for the extraction of iodine or bromine from brines there is one essential step, i.e. the oxidation of the bromide or the iodide to bromine or iodine. Almost universally, this oxidation is accomplished by contacting the brines with chlorine. Despite the suitability of using chlorine, there is a disadvantage in that the chlorine renders the waste brines highly acidic and thus, the waste brines are corrosive of the disposal equipment and are not suitable for disposal.

Heretofore, these waste brines have been treated with neutralizing agents such as lime to reduce their acidity. However, despite the general success of such treatment, troublesome precipitates are formed in the brines. These precipitates tend to clog up disposal equipment and, even more importantly, they settle out in the cooling ponds, thus filling them with solid matter. The only alternative then for the bromine or iodine producer is to frequently excavate the ponds or to build new ones.

Therefore, it is an object of this invention to provide a novel process for the treatment of waste brines. It is a further object of this invention to provide a process for the treatment of waste brines which is essentially free of precipitate formation.

THE INVENTION

This invention relates in part to an improved process for the treatment of waste brines with ammonia. More particularly, this invention relates to a process for treating, with ammonia, debrominated or diodated waste brines from conventional bromine or iodine extraction processes.

Generally speaking, processes for the recovery of bromine from brines comprise feeding the brine into the top of a tower at an elevated temperature of about 200° F., countercurrently contacting the brine with a chlorine stream and a steam stream, removing from the top of the tower elemental bromine which has been stripped by the steam and removing from the bottom of the tower a hot acidic debrominated waste. The stripped elemental bromine is then sent on to purification processes.

A typical iodine process includes clarifying the iodide containing brine to remove oil and other suspended material therefrom, adding chlorine to the brine, passing this solution over bales of copper wire and removing the acidic diodated waste stream from the vessel. The chlorine liberates the iodine as a free element in solution which then reacts with the copper wire to form insoluble cuprous iodide. This iodine is then recovered by placing the copper wire in agitated water which separates the adhering iodine from the copper wire. See the "Encyclopedia of Chemical Technology," by Kirk-Othmer, 2nd edition, volume II, pages 848–849, for other chlorine utilizing processes.

Treatment of the debrominated or deiodated waste brines is an integral part of the above processes. Since these waste brines are highly acidic and are usually hot, they should be both cooled and neutralized. As mentioned previously, it has been the practice in the past to neutralize waste brines with lime and then allow the waste brines to cool in cooling ponds. Despite the successfulness of this treatment, difficulties have been met in that precipitates on the order of 40 parts per million formed in the waste brine upon neutralization. Such precipitates present filling problems in the cooling ponds. Further, due to the length of time required to dissolve the lime, the control of the pH by the adjustment of the rate of lime feed is difficult at best. In contradistinction with the above precipitate forming treatment, it has now been found that the precipitate problem and the control problem can be alleviated by the utilization of ammonia as the neutralizing agent.

The neutralizing agent, i.e. the ammonia, may be either in gaseous or in liquid form. The utilization of the liquid form (aqueous ammonia), is preferred as it is easier to handle and requires simpler process design. Aqueous ammonia may be formed by simply dissolving gaseous ammonia in water. For best results in economy the ammonia should be dissolved in the water to approximately the saturation point. By weight, concentrations of from about 1 weight percent to about 35 weight percent ammonia may be used.

Generally speaking, the amount of ammonia required to treat the waste brine is that amount of ammonia which is sufficient to raise the pH of the waste brine to a range of from about 5.5 to about 6.0. The waste brine prior to the ammonia treatment usually has a pH of less than 5. In fact the pH of waste brine in some processes may be as low as 1. In these processes it has been found that the amount of ammonia required will be in a range of from about 2 to about 10 pounds of ammonia per 1000 gallons of brine. Of course, it is to be understood that if a higher pH is desired, then the addition of more ammonia will render the solution more basic. Conversely if a lower pH is required, then less ammonia is to be used.

Contacting the debrominated or deiodated waste brine with ammonia can be accomplished by any of several ways which are known to those skilled in the art. For example, contact may be accomplished by utilizing a mixing pump, by sparging the ammonia directly into the waste brine stream and the like. A preferred mode is described as continuously collecting the waste brine in a vessel having one wall shorter than the others, continuously adding ammonia to the collected liquid, allowing the neutralized brine to overflow the short wall of the vessel and collecting the overflow in a second vessel which has an outlet for the ultimate disposal of the neutralized brine. Control of the amount of ammonia fed can be accomplished by monitoring the pH of the treated waste brine as it leaves the second vessel and using the monitoring data to adjust the rate of ammonia fed.

The temperature and pressure at which the ammonia is contacted with the waste brine is not critical so long as the waste brine is not boiling.

As beforesaid, some processes have waste brines which are at elevated temperatures, e.g. 200° F. After neutralization with the ammonia, these hot substantially neutral waste brines are then sent to cooling ponds where they are allowed to stand and cool to atmospheric conditions. After cooling, the cooled waste brine is then disposed of in any one of many various ways. In most bromine and iodine extraction operations, the brine is disposed of by returning the waste brine to the source from which it came. For example, if the brine is a natural underground brine, then after extraction and treatment, the cool substantially neutral waste brine is merely returned to the wells by subterranean injection. If the brine is taken from the sea or salt lakes, the treated cooled brine is merely returned thereto. From an ecological standpoint the process of this invention is highly beneficial as the pH of the treated waste brines approximates the pH of the natural occurring brines. Further, this "normalization" of the waste brines is accomplished without the formation of large amounts of precipitates which in themselves present disposal problems. Furthermore, by cooling the brines in cooling ponds prior to ultimate disposal no thermal pollution is experienced.

It is also to be understood that the neutralization as described in this invention may be used to raise the pH of brines in general without the formation of substantial amounts of precipitates. The amount of ammonia, whether in gaseous or liquid form, will be determined by the same criteria as set forth hereinabove for the treatment of waste brines. Further, any of the previously mentioned modes of contacting ammonia with waste brine may also be used in the instant case. The utilization of the neutralization step of this invention is of utmost value to those who wish to adjust upward the pH of brines for their particular uses. For example, it may be desirable to render a brine essentially non-corrosive to protect operating equipment without the formation of precipitates in the brine.

The following examples are presented to further illustrate the characteristic features of this invention.

Example I 15 milliliters of a 1.04 N ammonium hydroxide solution were added to 450 milliliters of waste brine from a tower wherein bromine was extracted by treatment of brine with steam and gaseous chlorine. The pH of the waste brine rose from 0.6 to 6.0 after the addition of the ammonia. No visible precipitates were formed.

Example II

Hydrated lime in an amount of 0.7246 gram was added to 500 milliliters of waste brine from a tower wherein bromine was extracted by treatment of brine with steam and gaseous chlorine. The pH of the waste brine rose from 0.6 to 7.0 after the addition of the lime. The treated waste brine was cloudy and contained a dark brown fluocculent precipitate. This precipitate was filtered from the treated waste brine and dried. The dried precipitate weighed 26 milligrams.

As can be seen from the above examples, effective neutralization of the waste brines is accomplished through the utilization of ammonia. Furthermore and of utmost importance is the fact that no substantial amount of precipitates were formed which would tend to fill up the cooling ponds or clog equipment. Example II which utilized lime as a neutralizing agent clearly was not as efficient in this respect as the ammonia.

We claim:

1. In a process for extracting bromine or iodine from brines which includes treating the brines with chlorine, the improvement which comprises contacting debrominated or deiodated waste brine from said process, said to the disposal of said waste brine whereby the pH of the waste brine having a pH less than 5, with ammonia prior waste brine is raised to a pH of from about 5.5 to about 6.0 without the significant formation of precipitates therein.

2. The process of claim 1 wherein said ammonia is aqueous ammonia.

3. The process of claim 1 wherein said ammonia is aqueous ammonia and wherein said aqueous ammonia contains from about 1 to about 35 weight percent dissolved ammonia.

4. The process of claim 1 wherein the disposal of said waste brine is by subterranian injection.

5. The process of claim 4 wherein said waste brine is at an elevated temperature below its boiling point and wherein prior to said subterranian injection said waste brine is cooled by passing said brine into cooling ponds.

6. The process of claim 4 wherein the ammonia is aqueous ammonia.

7. The process of claim 4 wherein said ammonia is aqueous ammonia and wherein said aqueous ammonia contains from about 1 to about 35 weight percent dissolved ammonia.

References Cited

UNITED STATES PATENTS

| | | | |
|---|---|---|---|
| 3,350,292 | 10/1967 | Weinberger et al. | 210—59 X |
| 3,371,998 | 3/1968 | Schambra | 210—62 X |
| 3,647,683 | 3/1972 | Gunnarsson | 210—48 |
| 3,647,686 | 3/1972 | Gunnarsson | 210—48 |
| 3,167,505 | 1/1965 | Dunseth et al. | 210—57 X |
| 2,120,218 | 6/1938 | Heath et al. | 423—504 |
| 2,737,449 | 3/1956 | Thomsen | 423—505 X |

SAMIH N. ZAHARNA, Primary Examiner

T. G. WYSE, Assistant Examiner

UNITED STATES PATENT OFFICE
CERTIFICATE OF CORRECTION

Patent No. 3,769,208     Dated  October 30, 1973

Inventor(s)  Shirl E. Cook and Samuel R. Henderson

It is certified that error appears in the above-identified patent and that said Letters Patent are hereby corrected as shown below:

Col. 1, line 4, "Ethyl Corporation" should read -- Ethyl Corporation, a corporation of Virginia -- . Col. 3, line reads --fluocculent--, should read --flocculent--. Col. 4, line 10, reads --to the disposal of said waste brine whereby the pH of the--, should read, --waste brine having a pH less than 5, with ammonia prior--. Col. 4, line 11, reads --waste brine having a pH less than 5, with ammonia prior--, should read, --to the disposal of said waste brine whereby the pH of the--.

Signed and sealed this 6th day of August 1974.

(SEAL)
Attest:

McCOY M. GIBSON, JR.
Attesting Officer

C. MARSHALL DANN
Commissioner of Patents